United States Patent Office 2,868,772
Patented Jan. 13, 1959

2,868,772

POLYMERIZATION OF OLEFINS

Richard L. Ray and Thomas O. Sistrunk, Baton Rouge, La., assignors to Ethyl Corporation, New York, N. Y., a corporation of Delaware No Drawing. Application July 17, 1956
Serial No. 598,229

4 Claims. (Cl. 260—94.9)

This invention relates to the polymerization of hydrocarbon olefins and more particularly, but not exclusively, to the polymerization of ethylene to produce solid polymers.

Several of the hydrocarbon olefins are polymerizable to solid polymers having desirable physical properties. Probably the most important of such polymers is polyethylene since it is produced from ethylene, one of the cheapest monomers presently available. A number of processes are useful for polymerization of ethylene but each have certain inherent disadvantages. For example, the polyethylene currently manufactured is made using oxygen or peroxide catalysis. This process requires extremely high pressures and results in a product having a relatively low melting point and certain other inferior physical properties, at least for certain uses. Other processes require the use of expensive and/or hazardous chemical catalysts and, in many cases, obtain low catalyst utilization.

It is accordingly an object of this invention to provide a new and improved process for polymerizing hydrocarbon olefins. A more specific object is to provide an olefin polymerization process which is more precisely directable to desired products and performance. A further specific object is to provide a new and useful class of catalyst systems for effecting a directed low pressure olefin polymerization process. A more explicit object is to provide a process and catalyst therefor which is directed at will to produce a highly desirable polymer having relatively uniform molecular weight and other desirable properties. A further object is to provide such a process and a catalyst system therefor wherein a high output of the desired polymer is provided per unit quantity of catalyst. Other objects and advantages of the present invention will be apparent from the following description and appended claims.

It has now been discovered that these and other objects are attained by a relatively low pressure polymerization operation in the presence of a catalyst system including at least one oxygen-containing component as a director, and a primary catalyst system which includes a halogen compound of a refractory metal and an organometallic compound of metals of Group IV–A of the Mendeleev Periodic Table corresponding to the table on pages 392 and 393 of the Handbook of Chemistry and Physics, 36th edition, Chemical Rubber Publishing Company. These oxygen-containing components act as catalyst adjuvants or promoters, as discussed more fully hereafter, and they include oxygen and peroxygen compounds. These oxygen-containing directing materials can be employed singly or as mixtures to obtain particularly desirable effects.

It has been discovered that these catalyst adjuvants, in combination with the other components of the catalyst system exhibit dual effects upon the polymerization reaction. We have found that both the rate of polymer formation and the properties of the reactant polymer produced are effected by members of this class. Certain types of these adjuvants accentuate particularly the rate of reaction with less proportionate effect on the polymer properties, whereas other members predominantly effect the polymer properties and less markedly effect the rate of formation. The rate of reaction is very significantly effected as a general matter, being increased by a factor several hundred percent in substantially all instances. Various embodiments or members of the oxygen-containing directing materials have varying effectiveness with respect to this benefit, and can be selected on such a basis if desired. The second effect exhibited in varying degree by all members of this class is a change in the properties of the polymeric materials produced. The precise gradation of changes of the several factors will depend to some extent upon the monomer being reacted. However, for illustrative purposes, properties of importance when producing a solid polyethylene, can be enumerated. These include the melting point of the solidified polymer, the molecular weight or average molecular weight of these solids, and various strength tests including elongation at break, strength at yield or break, and flexural modulus. Generally, it is observed that the class of oxygen-containing directing materials which are essentially free oxygen or which release free oxygen easily by physical means, have an accentuated effect on the properties of the product polymers. On the other hand, the members of this class of materials which contribute the reaction directing effect because of being highly oxidized compounds, tend to provide an accentuated effect in promoting the rate of reaction, with a less significant effect on the properties of the polymer products. The practical significance of this is, of course, of extreme importance in that when reaction rate itself is a highly desirable objective, and quality control is less significant, materials disclosed herein containing highly available oxygen can be selected upon this basis. Indeed, the generally accepted criteria of solid polymer quality is somewhat misleading inasmuch as for certain markets the reverse trend of attributes might be desirable, as in the 1-use throw away field.

As generally described above, the catalyst system includes a primary catalyst system comprising an organometallic compound of a group IV–A metal and a halogen compound of a refractory metal. In addition to the primary catalyst components, a minor amount of a composition of material having readily available oxygen is employed as a catalyst adjuvant or promoter. These materials, as explained more fully hereafter, exhibit a dual effect on the polymerization, in that they effect the polymerization rate as such and in addition effect the properties of the polymeric products formed. Thus, a convenient and descriptive terminology for these materials is oxygen-containing reaction directors. These include materials in which oxygen is essentially available in free form (e. g., as fluids, including gaseous oxygen and liquid solutions) and highly oxidized compounds in which the oxygen is readily available for reactions such as decompositions, metathases, and the like. The highly oxidized compounds can be inorganic peroxides and also the organic peroxides.

The materials having oxygen essentially available in the free form are, as indicated normally gaseous materials or solutions of gases in suitable solvent. The highly oxidized compounds commonly called peroxygens which can be employed as the oxygen-containing directing materials are normally liquid or solid compounds. These include, for example, hydrogen peroxide, lithium peroxide, ammonium peroxide, sodium persulfate, potassium borate, potassium perborate, peracetic acid, perbenzoic acid, tertiary butyl peracetate, sodium perchlorate, sodium perbromate, lauroyl peroxide, ditertiary butyl peroxide, and diacetyl peroxide. Other typical examples of suitable peroxides are alkali and alkaline earth metal persulfates and perborates, such as lithium persulfate, calcium persulfate, ammonium perborate, sodium perborate, magnesium perborate; peracids, such as peroxypropionic acid; esters such as tertiary butyl perpropionate; alkali and alkaline earth perhalides, such as lithium perchlorate, calcium perchlorate, and sodium periodate. A large number of highly oxidized organic peroxides are suitable as oxygen directing materials. These include, for example, diethyl peroxide, propionyl peracids, cumene hydroperoxide, tertiary butyl hydroperoxide, tetralin hydroperoxide, t-butyl perbenzoate, di-isopropyl benzene hydroperoxide, and the like.

The organometallic compounds of the group IV–A metals can be fully alkylated or arylated or partially alkylated or arylated compounds of these metals. A particularly suitable example is tetraethyllead. The term organometallic compound includes the partly halogenated compounds of this character such as triethyllead chloride, diethyllead dichloride, ethyllead trichloride, triethyllead bromide, diethyllead di-iodide, diethyltin dichloride, tributyltin bromide, and triethyl germanium chloride. In some cases, the sulfides and acetates and other salts of either inorganic or organic acids are suitable, such as triethyllead acetate and the like.

The second component of the primary catalyst is a halogen-containing compound of a refractory metal, i. e., of a metal of Groups IV–B, V–B or VI–B of the Mendeleev Periodic Table. Examples of this component are the halides of titanium, zirconium, chromium, molybdenum, hafnium, and the like. Typical examples of these materials include titanium tetrachloride, other titanium halides, such as titanium tetrabromide, titanium tetraiodide, titanium tetrafluoride, or mixed halides, such as compounds or mixtures having empirical compositions corresponding to titanium difluoride dichloride, titanium monochloride trifluoride, titanium monochloride tribromide, titanium dichloride di-iodide, and titanium dibromide di-iodide or mixtures of these complex salts.

Other titanium compounds are also suitable, including the tri- and dihalides, such as titanium trichloride and titanium dichloride, the oxyhalides, the alcoholates, the salts of organic acids such as the acetates, propionates and benzoates, alkyl acetonates, and certain other alkyl titanium compounds, such as dicyclopentadienyl titanium diphenoxide.

Other suitable metal salts are hafnium halides, in particular hafnium tetrachloride, trichloride and tetrabromide; chromium halides, such as chromic chloride, chromous chloride, and oxyhalides, such as chromic oxybromide; molybdenum halides, including molybdenum pentachloride, molybdenum oxydibromide, and tungsten pentachloride.

The polymers produced by the process of this invention can range from moderately high molecular weight solids to extremely high molecular weight solids which are relatively stiff materials having a white opaque appearance and having tensile strengths materially greater than the conventional low pressure polyethylene products made by processes recently reported. In fact, the polymers produced using group IV–A metal organometallic compounds, e. g., tetraethyllead, and oxygen promoters appear to have a different chemical structure than polymers heretofore known. Moreover, most of the unsaturation in the polymers of this invention is of the 1-olefin type. Very little unsaturation of the cis- or transvariety is present in the polyethylene molecule.

As mentioned above, oxygen and peroxide catalysts have been used alone in the prior high pressure olefin polymerization process, but the dual effect of the oxygen directing compounds of the present invention when added to an olefin polymerization catalyst system is not universally applicable. We have made the surprising discovery that only certain polymerization catalyst systems are benefited when employing an oxygen-containing material as a reaction director, and further, that the advantages described herein are not obtained if any one of the three components of our catalyst system is omitted. These advantages are further demonstrated by the specific examples hereinafter.

In carrying out the process, many variations in technique are possible. One frequently employed method involves inserting an inert solvent into an autoclave or reaction vessel, adding the ternary catalyst system thereto, closing and pressurizing with ethylene or the desired olefin to be polymerized and heating at moderate temperatures for a reasonable period. The precise techniques of operation will be illustrated by the examples given hereafter wherein all parts are by weight unless otherwise specified.

To illustrate generally the polymerization of a normally gaseous olefin using a two component catalyst system, i. e., group IV–A organometallic compound and refractory metal halide but no oxygen-containing director with generally "base-line" conditions, the following example is illustrative.

Example I

A sealed autoclave provided with an agitator was charged in the absence of moisture or air with 250 parts of sodium dried pure hexane, 4 parts of titanium tetrachloride, 5.8 parts of tetraethyllead. The autoclave was then tightly closed and pressurized with a pure cylinder ethylene, anhydrous, at a pressure of about 600 pounds per square inch and the autoclave was externally heated to a temperature of about 115° C. There was no immediate evidence of reaction by any appreciable temperature change or drop in the indicated pressure of the system. The pressure, however, was maintained for a period of about three hours, and at that time the excess ethylene was vented and the autoclave and contents were cooled to atmospheric conditions.

The autoclave was opened, and a small amount of about 15–20 parts of polymeric material was observed in the hexane solvent. This slurry was passed through a filter and the solid material thereby isolated. The polymer was then placed in anhydrous xylene at a temperature of about 120° C. in contact with a lower layer of ethylene glycol. The polymer remained in the xylene phase and was either partially dissolved or swelled by this solvent. The mixture was intermittently stirred to facilitate extraction of the impurities from the polymer phase into the ethylene glycol phase. The ethylene glycol phase gradually became highly colored and the xylene phase, containing the polymer, became clear. After contact for approximately ½ hour, the polymer had the appearance of a clear gelatinous material and this phase was then decanted from the ethylene glycol phase. After separation of phases, the polymer was precipitated from the xylene by the addition of methanol and the precipitated polymer was thereafter washed twice with acetone. The polymer was thereafter dried in a vacuum oven at a temperature of 100° C.

A portion of the white dried polymer was pressed between heated plates into a semi-clear, semi-flexible sheet. A portion of this sheet was tested in an Instron Universal tester. The tensile strength (at yield) of the test sample was 3,000 p. s. i. and (at break) was 2,200 p. s. i., the flexural modulus was 99,000 p. s. i., the elongation (at yield) was 15 percent and (at break) was 620 percent.

The polymer had a melting point of 116° C. The melting point was obtained by using a standard polarizing microscope having a heating stage. The temperature of the sample was gradually raised while observing the sample between cross polarizers. Crystallinity of the same was manifested by a grayish color and its characteristic structural appearance. As the temperature approached the melting point, the color darkened and at the melting point the color sharply disappeared. This point is the point of disappearance of crystallinity or birefringence. Such a melting point is very sharp and highly reproducible.

The foregoing illustrates the results provided with a two component catalyst system. It should be noted at this point that the polymeric material made in the above example is by no means an inferior product, and in addition, the rate of production was quite respectable. The polymer, although having properties different from some of the products which are shown in subsequent examples, has very acceptable characteristics. For example, the melting point is appreciably above commercial polyethylene which melts at about 105° C. The benefits of the present invention lie in the use of a unique catalyst system, as defined, wherein the oxygen or peroxygen components permit directing a process to more rapid reaction and varying polymer properties generally as desired. The example immediately below illustrates an embodiment of the invention using a suitable organic peroxygen compound, benzoyl peroxide, as the oxygen-containing catalyst adjuvant.

*Example II*

The procedure defined in the foregoing example was followed virtually identically except that the autoclave charge included 0.1 part of benzoyl peroxide providing a total oxygen to titanium tetrachloride mole ratio of 0.038:1.0. The autoclave was again closed and pressurized at 600 p. s. i. with substantially pure ethylene and heated to a temperature in the neighborhood of about 100° C. The reaction began virtually immediately, as evidenced by a sharp rise in temperature of 4 or 5 degrees in as many minutes, despite the presence of a constant temperature heat transfer medium bath surrounding the autoclave. It has been found through many repetitions of this run and similar operations that this degree of temperature change is sharp evidence of an appreciable reaction, the polymerization reaction being highly exothermic. It was necessary to continuously valve-in ethylene in an appreciable rate to maintain the 600 p. s. i. pressure. This operation was continued for a period of about 7 hours. Upon termination of ethylene feed, the excess ethylene was vented and the reactor or autoclave was again cooled to ambient temperature. The vessel was opened and contents appear to be a solid mass of sponge-like polymeric material.

This crude, sponge-like wet mass was placed in xylene and processed generally as described in Example I. Examination of the pressed polymeric product showed the following properties. The tensile strength, at yield, of the test samples was about 2600 p. s. i., and, at break, 4900 p. s. i. The flexural modulus was 63,800 p. s. i., the elongation (at yield) was 16 percent and (at break) was 1714 percent.

This polymer had a melting point of about 135° C., this melting point being obtained by the relatively precise method above described.

Contrast of the results achieved in Example II immediately above shows increase in the production of polymer raised by a factor of at least tenfold (or, on a time basis, a production rate of at least fivefold). The product obtained had a tensile strength (at yield) slightly below the property of the Example I product, but the tensile strength at break was at least 60 percent higher. The product was much more pliable and flexible. The melting point was about 20° C. above the melting point of the preceding or "base" material. This example demonstrates clearly the surprising dual effect of change in polymer and change in production rate achieved by the present invention.

It should be noted at this point that in all the instances and examples herein, the yield of polymer based on the hydrocarbon fed, was quite high, many times approaching the theoretical. The losses which occurred were mostly mechanical, i. e., caused by the venting at the completion of a cycle. The yield is to be distinguished from a reaction rate of polymer production. The reaction rate is almost directly proportional to the production rate in a uniform sized reaction zone as employed in these examples.

When other organic peroxy compounds are substituted for the benzoyl peroxide employed in the above example, such as peracids, such as peroxypropionic acid; esters such as tertiary butyl perpropionate; perbenzoic acid, tertiary butyl peracetate, lauroyl peroxide, ditertiary butyl peroxide, and diacetyl peroxide, similar results are obtained, especially in regard to the high rate of polymerization. Other examples are diethyl peroxide, propionyl peracids, cumene hydroperoxide, tertiary butyl hydroperoxide, tetralin hydroperoxide, t-butyl perbenzoate, diisopropyl benzene hydroperoxide, and the like.

*Example III*

The procedure of Example I is repeated except that a section of the ethylene feed line is supplied with a measured quantity of pure dry oxygen gas and this is blown into the autoclave with the initial ethylene charge in the proportions of 0.024 mole of oxygen to 1 mole of the titanium tetrachloride.

As in Example II above, the reaction starts very promptly but upon termination of pressure operation after a period of about 7 hours, roughly ½ as much polymer product is obtained. The production increase, then, using this catalyst adjuvant, was at least 2–2.5 times the base production of Example I, or not as accentuated as in Example II. The polymer produced, however, has a higher melting point than the product of Example II.

*Example IV*

Example II is repeated except that sodium peroxide is fed in proportions providing about 0.009 mole of oxygen content per mole of titanium tetrachloride. A rate of reaction generally equal to the rapid reaction of Example II is provided, and the properties of the polymer are generally similar.

When the above example is repeated using ozone, hydrogen peroxide, lithium peroxide, ammonium peroxide, sodium persulfate, sodium perchlorate, sodium perbromate, potassium perborate, sodium percarbonate and peracetic acid. Other typical examples of suitable peroxides are alkali and alkaline earth metal persulfates and perborates, such as lithium persulfate, calcium persulfate, ammonium perborate, sodium perborate, magnesium perborate, lithium perchlorate, calcium perchlorate, sodium periodate, generally similar results are provided, particularly as benefits the reaction rate.

As already discussed, the organometallic component of the primary catalyst system can be selected from a substantial number of compounds of the group IV–A metals. The results obtained when such components are varied from the corresponding component used in the above examples will be generally similar, sometimes varying in degree.

*Example V*

Example II is repeated except that tetraphenyllead is employed instead of the tetraethyllead and the polymerization is conducted at a temperature of about 90° C. Generally, similar results are obtained.

*Example VI*

Example I is repeated except that tetraethyltin is employed instead of tetraethyllead and the polymerization is conducted at a temperature of 130° C.

*Example VII*

Example I is repeated except that tetraethylgermanium is employed and the temperature of the polymerization is maintained at approximately 150° C.

*Example VIII*

Example II was repeated except that 5 parts of tetramethyllead was employed instead of the tetraethyllead.

Again the polymerization began immediately and after 7 hours approximately 70 parts of polymer were obtained. The maximum temperature of the polymerization was 95° C., the melting point of the polymer was 136° C., the tensile strength (at yield) was 2903 p. s. i., the tensile strength at break was 2322 p. s. i., the elongation at break was 909 percent and at yield was 51 percent, and the flex modulus was 71,660 p. s. i.

When the above examples are repeated using tetraisopropyllead, dimethyl diethyllead, tetra-n-butyltin, tetraphenyltin, tetraisopropyl germanium, similar results are obtained.

Certain of the organometallic salts and in particular the halides, such as triethyl lead chloride, diethyllead dichloride, ethyllead trichloride, triethyllead bromide, diethyllead di-iodide, diethyltin dichloride, tributyltin bromide, and triethyl germanium chloride, when substituted in the above examples give generally similar results. In some cases, the sulfides and acetates and other salts of either inorganic or organic acids are suitable, such as triethyllead acetate, and the like.

The quantity of polymer produced per unit quantity of catalyst depends primarily upon the olefin polymerized, the period of the polymerization, the temperature of the polymerization and the particular organometallic compound used as a catalyst. Normally, a quantity of catalyst is employed commensurate with the polymerization capacity of the reaction vessel. The quantity of polymer produced is frequently from about 5 to 100 times or more the quantity of organometallic compound used in the polymerization.

The weight ratio of organometallic compound to refractory metal compound can vary widely, generally from about 0.1 to 100 and preferebaly from about 0.5 to about 10. Even lower or higher ratios can be employed but no particular advantage is obtained in using either component in great excess.

In connection with the use of the organometallic compounds described as a component of the primary reaction system, it is indeed surprising that the oxygen-containing materials, which are the catalyst adjuvants employed, should exhibit the pronounced effects shown. It would be expected that readily available oxygen would result in degradation of catalytic activity, by reaction, rather in enhancing and directing the catalyst effect.

*Example IX*

Example II was repeated except that 2 parts of finely divided aluminum were added to the system in addition to the other catalyst components prior to the addition of the ethylene. The aluminum was prepared by cutting parts from a rod of aluminum using a rotating cutter blade. The cutting was accomplished below the surfaces of hexane solvent so as to prevent contact of the freshly cut aluminum surfaces with air. Polymerization began immediately after the addition of ethylene and after 6½ hours, approximately 130 parts of polymer were obtained. The maximum temperature of the polymerization was somewhat above 150° C. The polymer had a melting point of 134° C.

Other Group III-A metals of the Mendeleev Periodic Table can be used, including gallium and indium. When used, the molar ratio should be from about 0.01 to about 100 metal/refractory metal compound, and preferably 0.1-50.

Presently, ethylene is the most interesting, commercially, of the hydrocarbon feeds to the process, but numerous others can be used. Generally, it can be said that a change of hydrocarbon feed, especially in the low molecular weight alpha olefins, results in shifts of the entire "spectra" of the several properties of interest. However, insofar as the dual effects of the oxygen-containing catalyst adjuvants are concerned, similar trends are provided. The examples below illustrate a variant in the hydrocarbon feed.

*Example X*

Example II is repeated except that propylene was employed instead of ethylene, the propylene being used at a pressure of 180-190 p. s. i. g. The maximum temperature of the polymerization was 101° C. The product was principally heavy oils.

*Example XI*

Example X was repeated except that a propylene pressure of only 50 p. s. i. g. was employed. The product contained tacky solids having a melting point of 120° C. and large quantities of heavy oils.

When the above examples are repeated employing styrene, butadiene or isoprene, similar results are obtained. Typical examples of other suitable hydrocarbon olefins are 1-butene, 1-pentene, 1-hexene, 1-octene, 1-dodecene, 2-butene, 2-pentene, 2-hexene, 2-octene, 2-methyl-1-butene, 3-methyl-1-butene, 2-methyl-1-pentene, 4-vinylcyclohexene, 2-methyl-2-butene, and cyclohexene. Also, copolymers of the above olefinic hydrocarbons can be produced, including ethylene-isobutylene, ethylene-butadienes, ethylene-styrene, and isobutylene-isoprene. Mixtures of three or more olefins can also be polymerized in accordance with this invention.

The examples below illustrate the use of various other refractory metal halide compounds as alternates to titanium tetrachloride.

*Example XII*

Example II is repeated except that zirconium tetrabromide is employed and toluene is used as the solvent. Similar results are obtained.

*Example XIII*

Example II is repeated except that vanadium tetrachloride is employed instead of titanium tetrachloride with similar results.

*Example XIV*

Example II is repeated except that chromium oxychloride is employed instead of titanium tetrachloride. Similar results are obtained.

Whe nthe above examples are repeated using other titanium halides, such as titanium tetrabromide, titanium tetraiodide, titanium tetrafluoride, or mixed halides, such as compounds or mixtures having empirical compositions corresponding to titanium difluoride dichloride, titanium monochloride trifluoride, titanium monochloride tribromide, titanium dichloride di-iodide, and titanium dibromide di-iodide or mixtures of these complex salts, similar results are obtained.

Other titanium compounds are also suitable, including the tri- and dihalides, such as titanium trichloride and titanium dichloride, the oxyhalides, the alcoholates, the salts of organic acids such as the acetates, propionates and benzoates, alkyl acetonates, and certain other alkyl titanium compounds, such as dicyclopentadienyl titanium diphenoxide.

Other suitable metal salts are hafnium halides, in particular hafnium tetrachloride, trichloride and tetrabromide, chromium halides, such as chromic chloride and chromous chloride, and oxyhalides, such as chromic oxybromide, molybdenum halides, including molybdenum pentachlcride, molybdenum oxydibromide, and tungsten pentachloride.

Other solvents or mixtures of solvents can be employed with similar results. Typical examples of suitable solvents are heptane, octane, decane, and higher alkane hydrocarbons. Aromatic hydrocarbons, such as xylene, mesitylene and naphthalene are also suitable for this invention. Other solvents can be employed which are inert under the reaction conditions.

The quantity of solvent is not critical and in fact quantities of solvent as low as 20 parts and as high as 600 parts per total charge of ethylene (usually 50 to 500 parts) have been employed with very satisfactory results. When a solvent is used, the higher concentrations are frequently preferred since the solvent aids in removing the heat of polymerization and permits the maintenance of uniform temperature conditions throughout the polymerization zone. Also, a solvent permits easier continuous reactor operation. In addition, the properties of the polymer can frequently be varied by selecting solvents having a particular solubility for the hydrocarbon polymer. Essentially pure aliphatic solvents are normally preferred.

The temperature of the polymerization is not critical, as illustrated by the above examples, but is important. In general, temperatures ranging from 0°–250° C. are satisfactory, although from 50°–150° C. is preferred. Likewise, a wide range of pressures can be used, from subatmospheric to 250 atmospheres or higher. Generally, between above 1 and 100 atmospheres of monomer pressure is preferred. In addition, other inert atmospheres such as nitrogen or hydrogen, can be employed and is sometimes desired.

The examples and description above clearly illustrate the beneficial effect of using the oxygen-containing catalyst adjuvants or directors of the present invention. Surprisingly, when these materials are used by themselves, at the conditions of and with the hydrocarbon feed of any of the foregoing examples, no solid polymer formation is encountered or else only trace quantities of oily material is formed, with high catalyst consumption. This demonstrates the adjuvant or promoting character of these materials. Further, when only one additional component of the catalyst system is used, in addition to the oxygen-containing adjuvant, no polymer formation is found or else it is attributable to the component solely. Thus, when oxygen and titanium tetrachloride, as used in Example III, but no tetraethyllead, are employed, there is no detectable difference in performance from operating with titanium tetrachloride alone, viz., a small amount of oil. Similarly, when only oxygen and tetraethyllead are used in the procedure of Example II, practically no polymer is formed.

Wide latitudes in proportions of the oxygen-containing material, of the present invention, are permissible depending in part on the results desired. In all instances, the oxygen-containing material is employed as a minor component, relative to the refractory metal halides in the primary catalyst system. Thus, the oxygen proportion, whether initially free or combined, is used in the concentration of from 0.00001 to about 0.10 mole of oxygen to one mole of the halogen compound. A preferred range is from 0.001 to about 0.05 mole of oxygen, free or combined, to one mole of the halogen compound.

Many suitable techniques can be employed to purify the crude polymer, the most preferred depending both upon the physical properties of the polymer and the nature of the impurities therein. Thus, the best clean-up procedure depends upon the specific method of polymerization, e. g., the catalyst, and the conditions of polymerization. In general, three different techniques can be used, viz., dissolve the polymer and reprecipitate, dissolve the impurities (leaving the polymer undissolved) and, lastly, melt the polymer and separate the liquid and solid phases.

Suitable solvents for certain of the polymers of this invention are benzene, toluene, xylene, naphthalene, tetrahydronaphthalene, decahydronaphthalene, cyclohexane, tetrahydrofuran and, in a limited number of cases, aliphatic hydrocarbons, such as octanes, decanes, and the like.

Solvents or reagents for removing impurities from the polymer depend primarily upon the catalyst system employed. The crude polymer can be mixed, comminuted or suspended in an acid solution, e. g., alcoholic or aqueous, or an alkali solution. Typical examples of acid solutions are methanol, ethanol, isopropanol and higher aliphatic alcohols containing hydrogen chloride, hydrogen bromide, hydrogen fluoride, nitric oxides, phosphorus oxides, oleum and salts which form acidic solutions in alcohols. Aqueous solutions of the same acids can be employed including mixed acids, such as aqua regia.

Typical basic reagents are alcoholic or aqueous solutions of the alkali or alkaline earth metal hydroxides or salts thereof of weak acids, such as sodium, potassium or calcium hydroxides or carbonates or acetates in methanol, ethanol, isopropanol, n-butanol or water. Aqueous alcoholic solutions can also be employed. Amines and other basis materials can also be employed.

The polymers of this invention are useful in essentially all the many applications of polyethylene and other thermoplastics now manufactured. Specifically, the products can be used in the production of sheets, films, fibers, coating and molded articles. The material can be extruded, injection molded and processed by other conventional techniques. It is particularly useful for electrical insulation, bottles, toys and in some cases structural applications. The greater crystallinity of this material makes it particularly suitable for fibers, and uses wherein it is subjected to relatively high temperatures, and uses requiring additional rigidity and improved strength properties, such as tensile strength.

We claim:

1. A process for the polymerization of hydrocarbon olefins selected from the group consisting of ethylene and propylene comprising polymerizing said olefin at a temperature between about 0 and about 250° C., and at a pressure up to 250 atmospheres in the presence of a catalyst comprising a tetraorganometallic compound of a metal selected from the group consisting of germanium, tin and lead and in which said organo group is selected from the group consisting of alkyl and aryl groups, a halide of a metal selected from the group consisting of metals of Groups IV–B, V–B and VI–B of the Mendeleev Periodic Table corresponding to the table given on pages 392 and 393 of the Handbook of Chemistry and Physics, 36th edition, Chemical Rubber Publishing Company, and a catalyst adjuvant material selected from the group consisting of molecular oxygen and peroxides, said catalyst adjuvant material being present in from about 0.001 to about 0.1 mole per mole of said halide.

2. The process of claim 1 wherein said olefin is ethylene, said tetraorganometallic compound is a lead compound and said halide compound is a titanium compound.

3. The process of claim 2 wherein said titanium compound is a chloride.

4. A polymerization catalyst comprising a tetraorganometallic compound of a metal selected from the group consisting of germanium, tin and lead in which said organo group is selected from the group consisting of alkyl and aryl groups, a halide of a metal selected from a group consisting of a metal of Groups IV–B, V–B and VI–B of the Mendeleev Periodic Table corresponding to the table given on pages 392 and 393 of the Handbook of Chemistry and Physics, 36th edition, Chemical Rubber Publishing Company, and a catalyst adjuvant material selected from the group consisting of molecular oxygen and peroxides, said tetraorganometallic compound being present in said catalyst in a concentration of from about 0.1 to about 100 moles per mole of said halide, said catalyst adjuvant material being present in a concentration of from 0.001 to about 0.1 mole per mole of said halide.

References Cited in the file of this patent

UNITED STATES PATENTS

| | | |
|---|---|---|
| 2,475,520 | Roedel | July 5, 1949 |
| 2,721,189 | Anderson | Oct. 18, 1955 |
| 2,762,791 | Pease | Sept. 11, 1956 |

FOREIGN PATENTS

| | | |
|---|---|---|
| 533,362 | Belgium | May 16, 1955 |